United States Patent
Chen et al.

(10) Patent No.: US 7,124,080 B2
(45) Date of Patent: Oct. 17, 2006

(54) METHOD AND APPARATUS FOR ADAPTING A CLASS ENTITY DICTIONARY USED WITH LANGUAGE MODELS

(75) Inventors: Zheng Chen, Beijing (CN); Jianfeng Gao, Beijing (CN); Mingjing Li, Beijing (CN); Feng Zhang, Blacksburg, VA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 10/008,432

(22) Filed: Nov. 13, 2001

(65) Prior Publication Data

US 2003/0093263 A1    May 15, 2003

(51) Int. Cl.
G10L 15/06 (2006.01)
G10L 15/00 (2006.01)

(52) U.S. Cl. ........................ 704/244; 704/243; 704/231
(58) Field of Classification Search ...................... None
See application file for complete search history.

(56) References Cited

U.S. PATENT DOCUMENTS

| | | | | |
|---|---|---|---|---|
| 5,251,316 | A * | 10/1993 | Anick et al. | 707/101 |
| 5,765,132 | A * | 6/1998 | Roberts | 704/254 |
| 5,852,801 | A * | 12/1998 | Hon et al. | 704/244 |
| 6,138,099 | A * | 10/2000 | Lewis et al. | 704/257 |
| 6,157,912 | A * | 12/2000 | Kneser et al. | 704/270 |
| 6,334,102 | B1 * | 12/2001 | Lewis et al. | 704/255 |
| 6,442,519 | B1 * | 8/2002 | Kanevsky et al. | 704/243 |
| 6,460,017 | B1 * | 10/2002 | Bub et al. | 704/256 |
| 6,879,956 | B1 * | 4/2005 | Honda et al. | 704/244 |
| 6,885,758 | B1 * | 4/2005 | Bayer | 382/101 |
| 2002/0065653 | A1 * | 5/2002 | Kriechbaum et al. | 704/231 |
| 2002/0087309 | A1 * | 7/2002 | Lee at al. | 704/240 |

OTHER PUBLICATIONS

Wada, Y. Kobayashi, N. Kobayashi, T. "Robust language modeling for a small corpus of target tasks using class-combined word statistics and selective use of a general corpus" Transactions of the institute of elecronics information and communication, Nov. 2000, pp. 2397-2406.*

Ji-Hwan Kim and P.C. Woodland, "A Rule-Based Named Entity Recognition System for Speech Recognition," In Proceedings of the Sixth International Conference on Spoken Language Processing, vol. 1, pp. 528-531 (2000).

Bikel, D. et al., "NYMBLE: A High-Performance Learning Name-Finder," In Proceedings of the Fifth Conference on Applied Natural Language Processing, Association for Computational Linguistics, pp. 1994-2201 (1997).

(Continued)

*Primary Examiner*—David Hudspeth
*Assistant Examiner*—Matthew J. Sked
(74) *Attorney, Agent, or Firm*—Theodore M. Magee; Westman, Champlin & Kelly, P.A.

(57) ABSTRACT

A method and apparatus are provided for augmenting a language model with a class entity dictionary based on corrections made by a user. Under the method and apparatus, a user corrects an output that is based in part on the language model by replacing an output segment with a correct segment. The correct segment is added to a class of segments in the class entity dictionary and a probability of the correct segment given the class is estimated based on an n-gram probability associated with the output segment and an n-gram probability associated with the class. This estimated probability is then used to generate further outputs.

6 Claims, 6 Drawing Sheets

OTHER PUBLICATIONS

X. Huang et al., "Unified Stochastic Engine (USE) for Speech Recognition," ICASSP-93, vol. 2, pp. 636-639 (1993).

Zheng Chen, Kai-Fu Lee,"A New Statistical Approach to Chinese Pinyin Input," In Proceedings of the 38th Annual Meeting of the Association for Computational Linguistics, pp. 241-247 (2000).

Fred. Jelinek et al., "A Dynamic Language Model for Speech Recognition," In Proceedings of the DARPA Workshop on Speech and Natural Language, pp. 293-295, Pacific Grove, California, Defense Advanced Research Projects Agency, Morgan Kaufmman.

* cited by examiner

METHOD AND APPARATUS FOR ADAPTING A CLASS ENTITY DICTIONARY USED WITH LANGUAGE MODELS

BACKGROUND OF THE INVENTION

The present invention relates to language models. In particular, the present invention relates to adapting language models based on user input.

Language models provide a measure of the likelihood of a series of words appearing in a string of text. Such models are used in speech recognition, Chinese word segmentation, and phonetic-to-character conversion, such as pinyin-to-hanzi conversion in Chinese, to identifying a most likely sequence of words given a lattice of possible sequences. For example, in speech recognition, a language model would identify the phrase "go to bed" as being more likely than the phonetically similar phrase "go too bed".

Typically, language models are trained on a corpus of sentences. Although such corpora are effective for training language models to handle general words, they are not very effective for training language models to handle proper nouns such as the names of people and businesses. The reason for this is that proper names do not occur with enough frequency in a corpus to be accurately modeled.

Some systems allow users to correct mistakes made by the language model. However, even after a system knows about the correction, there is no way for the system to adjust the language model based on the correction because there is no way to assess the probability of the word sequence formed by the correction. Because of this, the system will generally make the same mistake later when it encounters the same input.

Thus, a system is needed that allows a language model and a dynamic dictionary to be modified based on corrections made by a user.

SUMMARY OF THE INVENTION

A method and apparatus are provided for augmenting a language model with a class entity dictionary based on corrections made by a user. Under the method and apparatus, a user corrects an output that is based in part on the language model by replacing an output segment with a correct segment. The correct segment is added to a class of segments in the class entity dictionary and a probability of the correct segment given the class is estimated based on an n-gram probability associated with the output segment and an n-gram probability associated with the class. This estimated probability is then used to generate further outputs.

DETAILED DESCRIPTION OF ILLUSTRATIVE EMBODIMENTS

Figure 1:
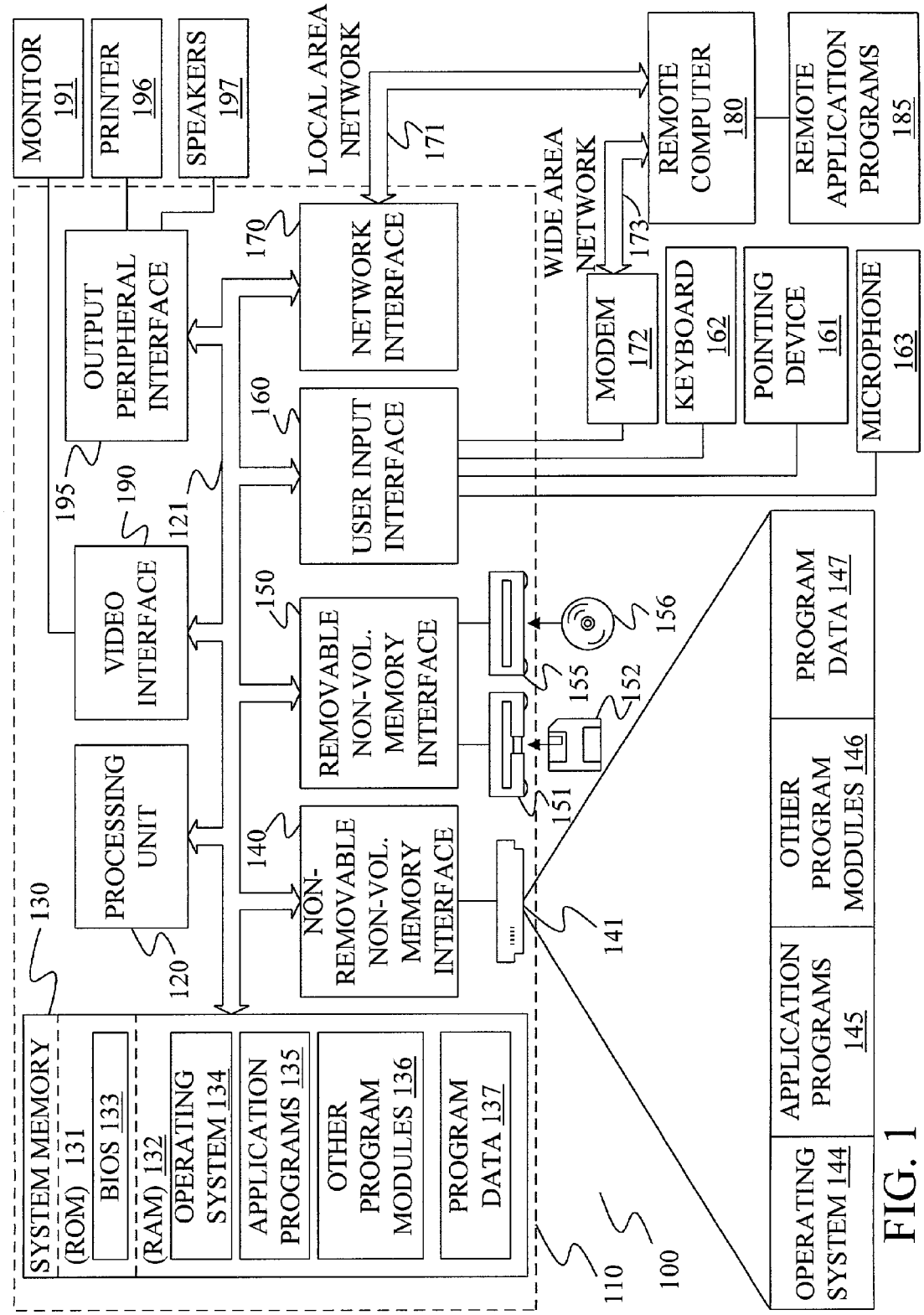
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
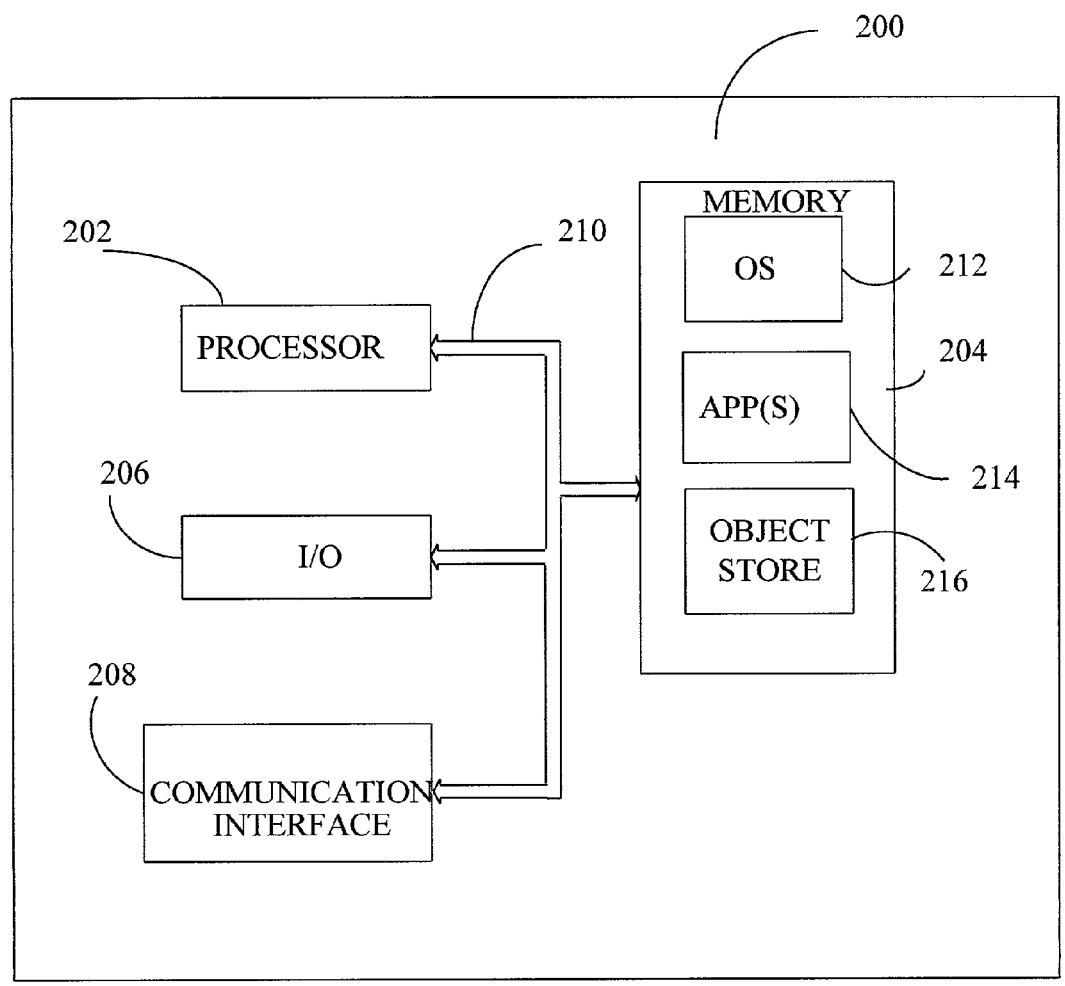
FIG. 2 is a block diagram of an alternative computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a means for using and adapting a statistical language model and a class-based dictionary in various applications. A statistical language model provides the likelihood that a sequence of words will appear in a language. In general, an n-gram language model defines the probability of a sequence of words as:

$$Pr(H)=Pr(w_1)*Pr(w_2|w_1)* \ldots *Pr(w_i|w_{i-(n-1)}, \ldots, w_{i-1})* \ldots *Pr(w_t|w_{t-(n-1)}, \ldots, w_{t-1}) \quad \text{EQ. 1}$$

where H is a sequence of words $w_1, w_2, \ldots, w_t$, t is the number of word in the sequence, n−1 is the number of past words that are used to predict the next word, and $Pr(w_i|w_{i-(n-1)}, \ldots, w_{i-1})$ is the probability of the ith word given the n−1 preceding words. Thus in a bigram language model, n=2, and in a trigram language model n=3.

One problem with statistical language models is that they do not provide accurate probabilities for unknown or rarely used words such as proper nouns. To overcome this, the present invention utilizes a class-based language model.

In the class-based language model of the present invention, the model predicts the probability of sequences of classes of words and individual words. To do this, equation 1 is modified when a class is used in place of one or more words. For example, for a trigram language model, the probabilities calculated in connection with a class token N are:

$$Pr(H)= \ldots *Pr(w_{i-1}|w_{i-3},w_{i-2})*Pr(T_i|N_i)*Pr(N_i|w_{i-2},w_{i-1})*Pr(w_{i+1}|w_{i-1},N_i)* \ldots Pr(w_{i+2}|N_i,w_{i+1})* \ldots \quad \text{EQ. 2}$$

where only those probabilities near the class probabilities are shown in equation 2 for simplicity, $N_i$ is the class at the ith position in the sequence, $T_i$ is an entity in class N, and $Pr(T_i|N_i)$ is referred to as an inside probability that provides the probability of entity T given class N. Under one embodiment, the inside probability is provided by a class entity dictionary that defines the words found in each class. Under one embodiment, the class entity dictionary provides a set of grammar rules that define known words that are found in particular classes. For example, a context-free grammar for the class [NAME] may include the rule "Hank Hanson". The outside probabilities (the probability of a class given previous words) is provided by the class-based language model.

A class-based language model helps to overcome the sparseness problem associated with certain classes of words such as proper nouns. Such words appear so infrequently in the training data that a language model that does not use classes will always prefer more common words over the infrequently used words. By using classes, the language model of the present invention increases the likelihood of a class being identified since a class of words occurs more frequently in the training data than an individual word of the class.

Before a class-based language model or class entity dictionary can be used, they must be trained. Under one embodiment, the class-based language model and the class entity dictionary are initially trained by first tagging a training corpus to identify words that fall within classes based on a set of heuristics. The heuristics provide a set of rules that predict the location of a class of words based on other words in the input. For example, if the verb "call" is a possible word in the input, the heuristic rules may indicate that the next word or next two words after "call" should be considered part of the [NAME] class. (For example, "Call Jack Jones").

The words that are identified using the heuristics are replaced with their class and the class-based language model is then trained using standard training techniques on the words and classes in the corpus.

The class entity dictionary is initially trained by dividing the words identified for each class into sub-components. These sub-components are then used in a standard n-gram training technique to identify probabilities for the words given the class. Such probabilities form the inside probabilities for the class.

An additional aspect of the present invention provides for updating and expanding the class entity dictionary and the class-based language model based on input provided by the user. In particular, the class entity dictionary is expanded when a user changes a decoded sequence of words so that the modified sequence includes a word that is not in the class entity dictionary. For example, if the class-based language model and class entity dictionary decode the sequence of words "write a letter to Phil" and the user changes the sequence to "write a letter to Bill", "Bill" will be added to the class-entity dictionary if it was not previously in the class-entity dictionary.

In order to add an entity to the class-entity dictionary, an inside probability for the entity must determined. As noted above, the inside probability provides the probability of an entity given a class. This probability cannot be calculated exactly because there is not enough data to establish the likelihood of the entity given the class. Instead, under embodiments of the present invention, this inside probability is estimated by assuming that, at a minimum, the product of the inside probability for the entity and the language model probability for the class should be equal to the language model probability for the word that was incorrectly identified by the decoder.

In terms of an equation for a trigram language model, this assumption reads as:

$$Pr(T_i|N_i)*Pr(N_i|w_{i-2},w_{i-1})=Pr(p_i|w_{i-2},w_{ii-1}) \quad \text{EQ. 3}$$

where $Pr(T_i|N_i)$ is the inside probability of the modified entity $T_i$ given the class $N_i$, $Pr(N_i|w_{i-2},w_{i-1})$ is the language model probability for class $N_i$ given the two preceding words in the sequence, and $Pr(p_i|w_{i-2},w_{i-1})$ is the language model probability for the incorrect entity $p_i$ that was decoded and later modified to form the modified entity $T_i$.

Using this assumption, the inside probability is then estimated as:

$$Pr(T_i \mid N_i) = \frac{Pr(p_i \mid w_{i-2}, w_{i-1})}{Pr(N_i \mid w_{i-2}, w_{i-1})} \quad \text{EQ. 4}$$

However, this estimate is highly dependent on the preceding words in the sequence. To lower this dependence and thus make the estimate more general, the probability is re-written as:

$$Pr(T_i \mid N_i) = \frac{Pr(p_i \mid <\text{unknown}>_{i-2}, <\text{unknown}>_{i-1})}{Pr(N_i \mid <\text{unknown}>_{i-2}, <\text{unknown}>_{i-1})} \quad \text{EQ. 5}$$

where $Pr(p_i \mid <\text{unknown}>_{i-2}, <\text{unknown}>_{i-1})$ represents the probability of $p_i$ given any two preceding words and $Pr(N_i \mid <\text{unknown}>_{i-2}, <\text{unknown}>_{i-1})$ represents the probability of class $N_i$ given any two preceding words. Note that $Pr(p_i \mid <\text{unknown}>_{i-2}, <\text{unknown}>_{i-1})$ and $Pr(N_i \mid <\text{unknown}>_{i-2}, <\text{unknown}>_{i-1})$ are stored in the language model during training by replacing preceding words with the <unknown> tokens and determining the probability of $p_i$ and $N_i$ given the <unknown> tokens.

Once the probability has been estimated for the modified entity, the modified entity and the estimated inside probability are added to the class entity dictionary under the appropriate class.

Figure 3:
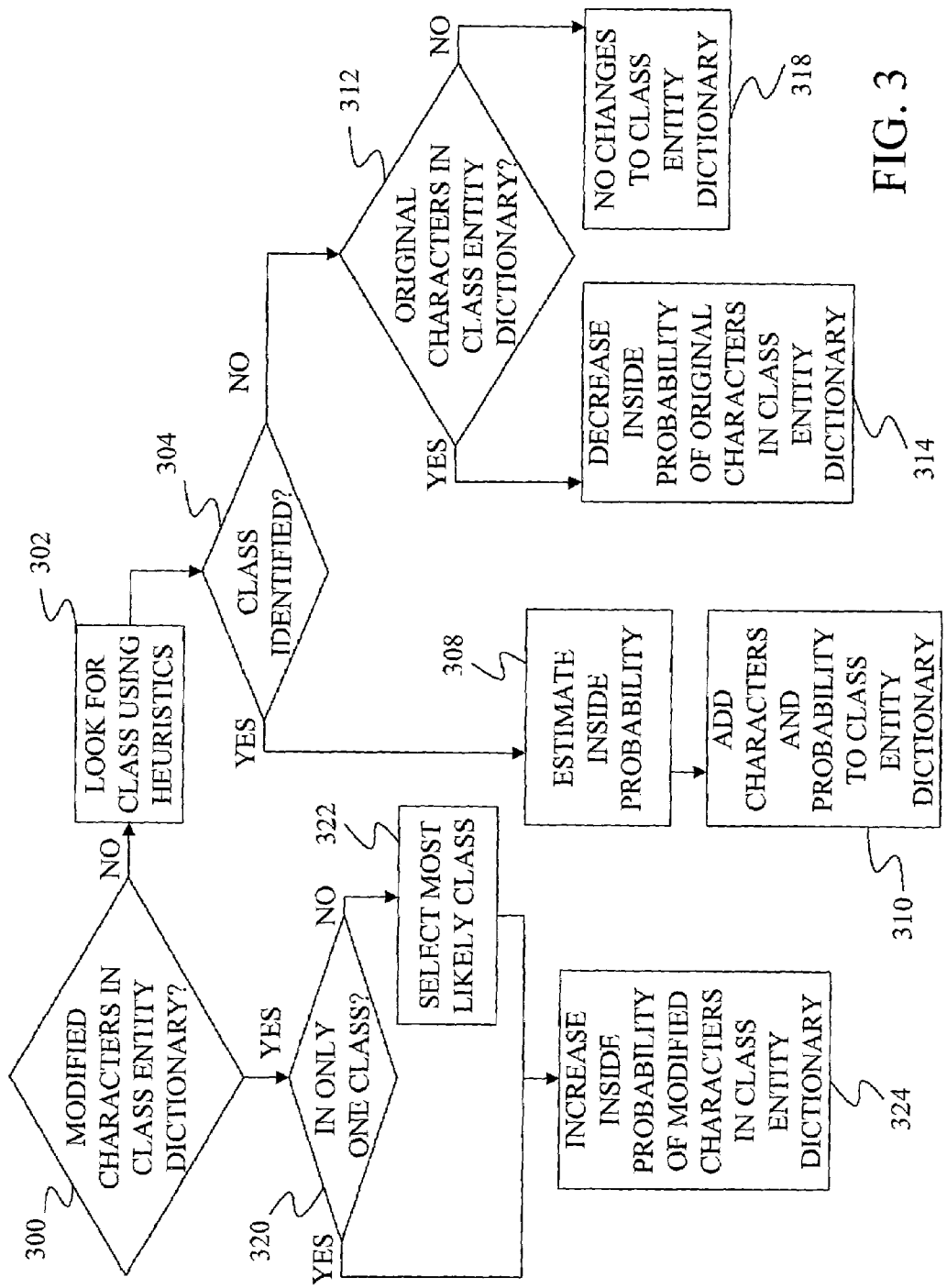
FIG. 3 is a flow diagram for updating a class entity dictionary under one embodiment of the present invention.

User modifications to the decoded sequence of words do not always involve words that were not present in the class-entity dictionary. Instead, either the original decoded word or the modified word may have been present in the class-entity dictionary. FIG. 3 provides a flow diagram of the steps used to determine how to alter the class entity dictionary based on user modifications.

As an overview, the process of FIG. 3 can adjust the inside probabilities in three ways. For a modified word that was already in the class entity dictionary, the fact that the word was not decoded indicates that its inside probability is too low. As such, its probability must be increased. For a decoded word that is in the class entity dictionary, the fact that the user modified the word indicates that the decoded word's inside probability is too high. As such, its probability must be decreased. For a modified word that is not in the dictionary, the modified word must be added to the dictionary and its initial probability calculated using Equation 5 above.

To determine which adjustment to make, the process of FIG. 3 begins at step 300 where the sequence of words produced by the user modification is examined to determine if the modified word is in the class entity dictionary. If the modified word is in the class entity dictionary, a determination is made as to whether the modified words are found in only a single class at step 320.

If the modified words are found in more than one class, the class-based language model is used to select the most likely class by using each of the possible classes in a separate sequence and identifying the sequence that provides the highest likelihood. This is shown as step 322 in FIG. 3.

If the modified words are only found in a single class in step 320 or after a single class has been identified at step 322, the inside probability for the modified characters needs to be adjusted because even though the modified words were in the class entity dictionary, the decoder did not identify them from the input because their inside probability was too low. To correct this, the inside probability stored in the class entity dictionary for the modified characters is increased at step 324. Under some embodiments, the inside probability is increased by multiplying it by a factor of 1.5.

If the modified characters are not in the class entity dictionary at step 300, a set of heuristics is used at step 302 to determine possible classes for the modified characters. Each of these classes is then used to build a separate sequence or words with the other decoded words. The class-based language model is then used to identify the most likely sequence and thus the most-likely class for the modified word.

If a class can be identified for the modified word at step 304, an inside probability for the modified word is determined using equation 5 above at step 308 and the modified word and probability are added to the class entity dictionary at step 310.

If a class cannot be identified for the modified word at step 304, the word that was decoded and modified by the user is examined at step 312 to determine if the decoded word is in the class entity dictionary. If the decoded word is in the dictionary at step 312, the fact that the decoded word was identified instead of the modified word means that the inside probability for the decoded word is set too high. To correct this, the inside probability for the decoded words is decreased at step 314. Under many embodiments, the inside probability is reduced by a factor of 1.5. (In other words, the inside probability is divided by 1.5 to form the new probability).

If the decoded word is not in the class entity dictionary at step 312, no changes need to be made to the class entity dictionary since neither the decoded nor the modified word falls within a class. As such, the class entity dictionary is left unchanged at step 318.

Figure 4:
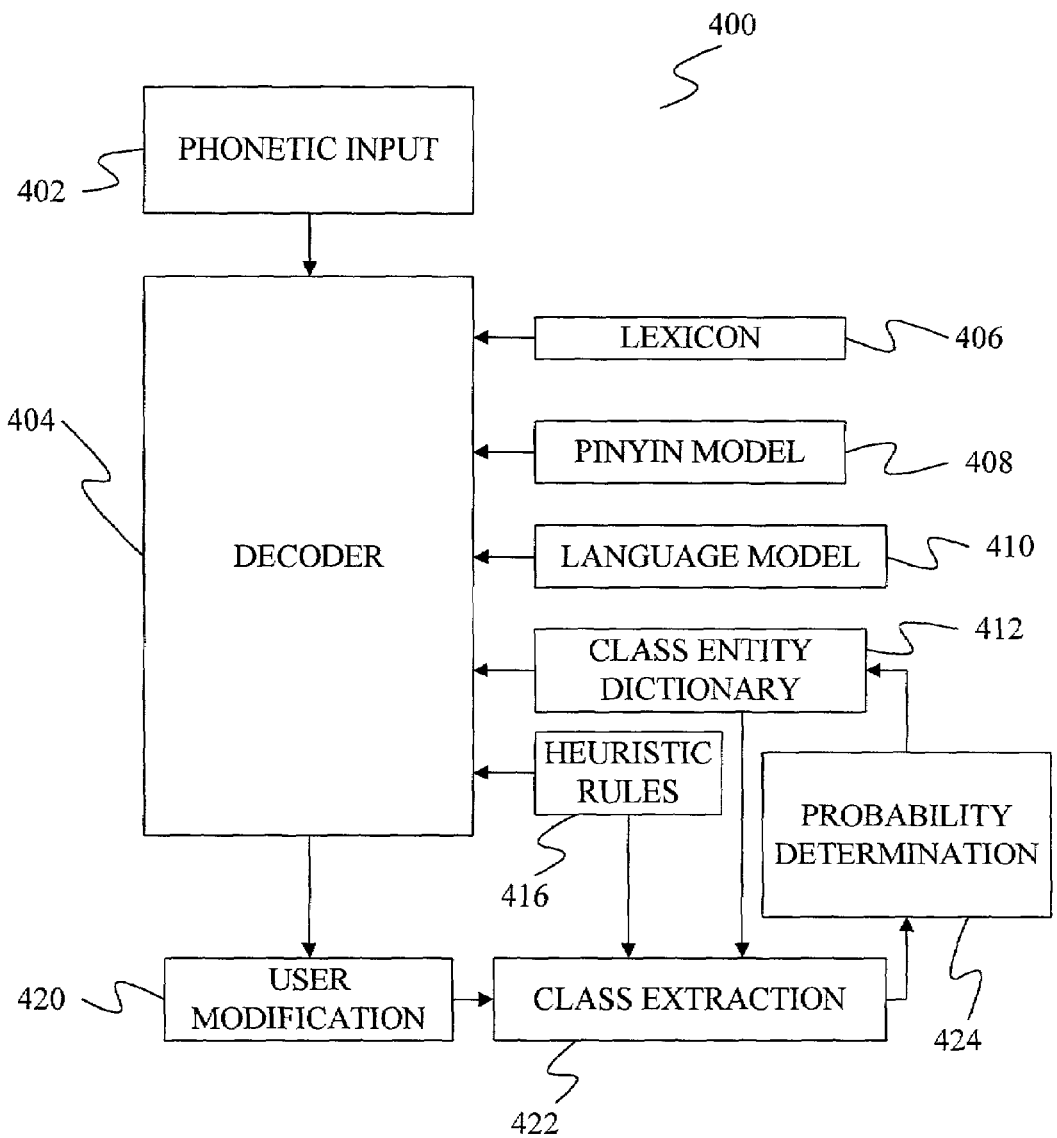
FIG. 4 is a block diagram of a pinyin-to-character conversion embodiment of the present invention.

The class-based language model and the method of updating a class-based language model under the present invention may be used in many systems. For example, FIG. 4 provides a block diagram of a phonetic-to-character conversion system 400 that can be implemented in the environments of FIGS. 1 and 2 and that utilizes an embodiment of the present invention. The operation of this system is shown in the flow diagram of FIG. 5.

Figure 5:
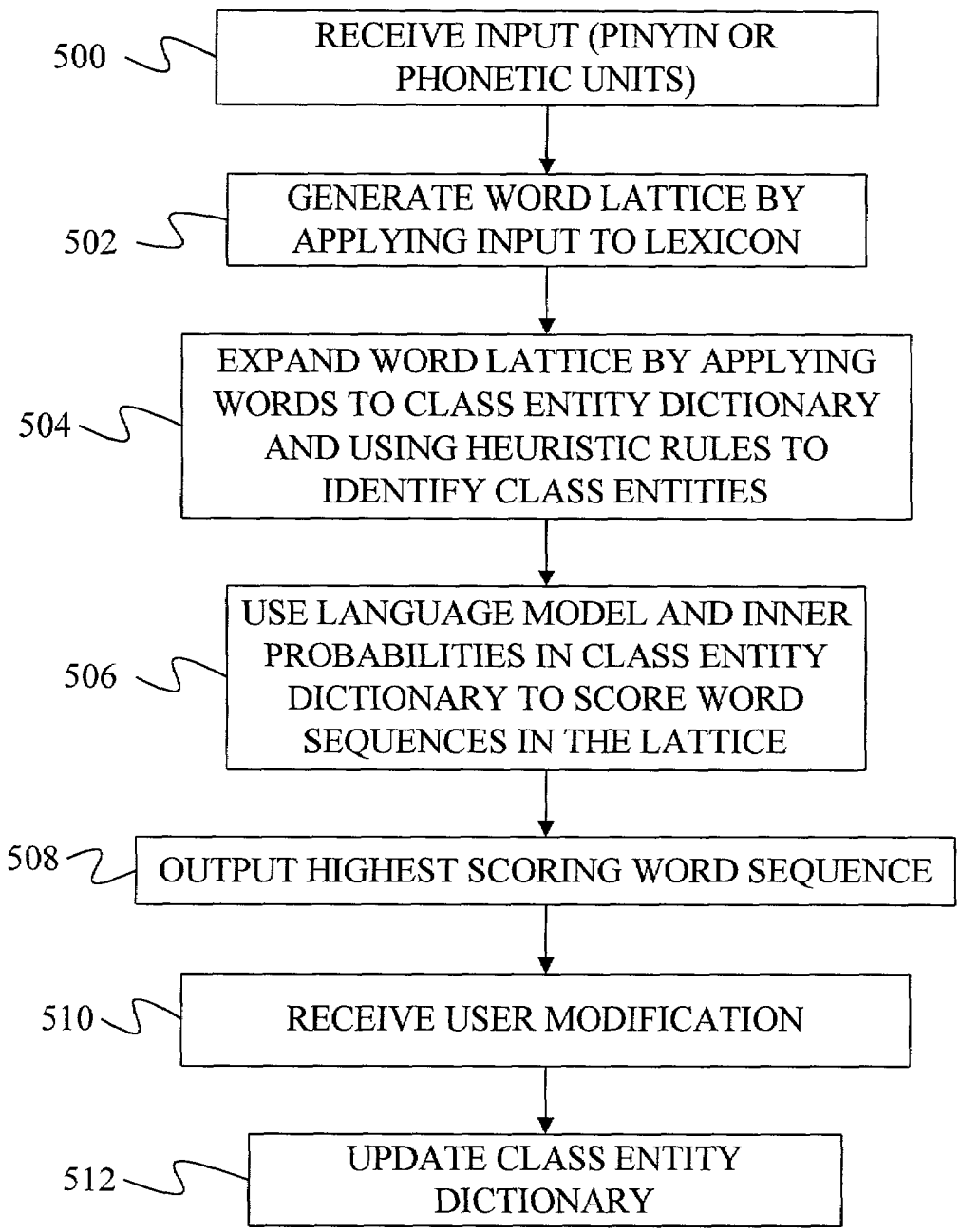
FIG. 5 is a flow diagram for utilizing a class entity dictionary under one embodiment of the present invention.

At step 500 of FIG. 5, phonetic input 402, which is the phonetic description of characters found in a character-based language such as Chinese, Japanese, or Korean, is provided to a decoder 404. In Chinese, one embodiment of the phonetic input is pinyin input. At step 502, decoder 404 first builds a lattice of possible words that can be represented by the phonetic input using a lexicon 406. The lattice is then expanded at step 504 by identifying class entities from the words in the lattice using class entity dictionary 412 and heuristic rules 416. The identified classes are added as separate nodes in the lattice.

At step 506, decoder 404 determines a probability for each path through the lattice using a phonetic model 408, which provides the probability that each word along the path will represent a phonetic segment, the class entity dictionary, which provides the inside probability for the classes, a language model 310, which provides the probability of a sequence of words and/or classes occurring in a language and equation 2 above. The sequence of words along the path that provides the highest probability is then output as the decoded string of words at step 508.

After the decoded sequence has been provided to the user, the system can receive user modifications 420 at step 510.

This modification indicates the correct words that the user intended by their input. At step 512, this user modification is examined to determine how it should be used to alter the class entity dictionary using the process of FIG. 3. In particular, class extraction unit 422 uses heuristics 416 and class entity dictionary 412 to identify a class for the modified word and to determine if the decoded word or the modified word is in the class entity dictionary. A probability determination unit 424 then calculates a probability for the modified word if it was not present in the dictionary or determines a new probability for the modified word or the decoded word to improve the performance of the decoder as indicated above in FIG. 3.

Figure 6:
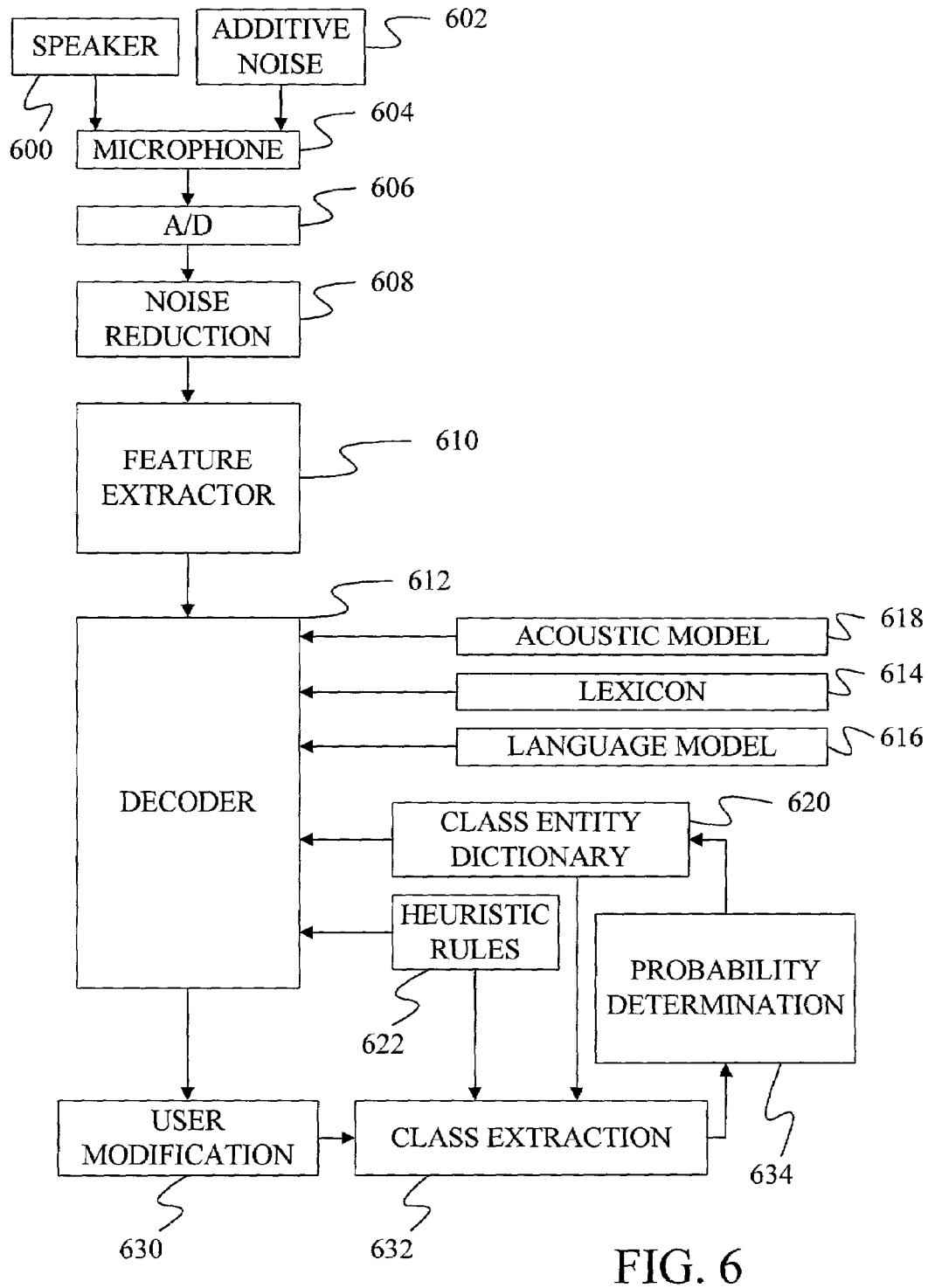
FIG. 6 is a block diagram of a pattern recognition system embodiment of the present invention.

In a second embodiment, the class-based language model of the present invention is used in a speech recognition system such as the speech recognition system of FIG. 6. In FIG. 6, an input speech signal from a speaker 600 and additive noise 602 are converted into an electrical signal by a microphone 604, which is connected to an analog-to-digital (A-to-D) converter 606.

A-to-D converter 606 converts the analog signal from microphone 604 into a series of digital values. In several embodiments, A-to-D converter 606 samples the analog signal at 16 kHz and 16 bits per sample, thereby creating 32 kilobytes of speech data per second.

The digital data created by A-to-D converter 606 is provided to an optional noise reduction module 608, which removes some of the noise in the digital signal using one or more noise reduction techniques.

The output of noise reduction module 608 is provided to a feature extractor 600, which extracts a feature from the digital speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values from noise reduction module 608 and produces a stream of feature vectors that are each associated with a frame of the speech signal. In many embodiments, the centers of the frames are separated by 10 milliseconds.

Note that although noise reduction module 608 is shown before feature extractor 600 in the embodiment of FIG. 6, in other embodiments, noise reduction module 608 appears after feature extractor 600.

The stream of feature vectors produced by the extraction module is provided to a decoder 612, which identifies a most likely sequence of words based on the stream of feature vectors, a lexicon 614, a language model 616, an acoustic model 618, heuristic rules 622 and a class entity dictionary 620.

Acoustic model 618 provides a probability that an input feature vector was created by the pronunciation of a linguistic unit such as a senone, phoneme, diphone, or triphone.

Language model 616, class entity dictionary 620 and heuristic rules 622 are used by decoder 612 in a manner similar to the way decoder 404 uses language model 410, class entity dictionary 412, and heuristic rules 416.

Based on the acoustic model, the language model, the lexicon, the class entity dictionary, and the heuristic rules, decoder 612 identifies a most likely sequence of words from all possible word sequences. In particular, decoder 612 uses steps 500, 502, 504, 506, and 508 of FIG. 5 to identify the most likely word sequence.

The most probable word sequence is then subjected to possible user modification 630. If the user modifies words in the decoded sequence, the modified words are provided to a class extraction unit 632 and a probability determination unit 634, which operate in a manner similar to class extraction 422 and probability determination unit 424 of FIG. 4. Using the process of FIG. 3, the class entity dictionary 620 is then modified based on the user modifications of the decoded words.

Although the present invention has been described with reference to particular embodiments, workers skilled in the art will recognize that changes may be made in form and detail without departing from the spirit and scope of the invention.

What is claimed is:

1. A method of decoding input, the method comprising:
   identifying possible sequences of words from the input;
   using a class-based language model and a class entity dictionary to select one of the possible sequences of words as an output sequence, the class entity dictionary providing the probability of an entity given a class;
   receiving modifications made to the output sequence by receiving a modified entity that represents a modification of a decoded entity in the ouput sequence; and
   using the modifications to change the class entity dictionary by adding the modified entity to the class entity dictionary and estimating a probability for the modified entity given the class to which the entity is added based on an n-gram probability associated with the decoded entity and an n-gram probability associated with the class to which the modified entity is added.

2. The method of claim 1 wherein receiving modifications comprises receiving a modified entity that represents a modification of a decoded entity in the output sequence and wherein the modified entity is not found in the class entity dictionary but the decoded entity is found in the class entity dictionary.

3. The method of claim 2 further comprising decreasing the probability of the decoded entity.

4. A computer-readable medium having computer-executable instructions for performing steps comprising:
   generating a sequence of words based in part on a class entity dictionary that provides probabilities for entities in at least one class;
   receiving a modification to the sequence of words such that a decoded entity in the sequence of words is modified into a modified entity; and
   adding the modified entity to the class entity dictionary and estimating a probability for the modified entity in the class entity dictionary based on an n-gram probability associated with the decoded entity and an n-gram probability associated with the class, the probability providing the probability of the modified entity given a class.

5. The computer-readable medium of claim 4 further comprising decreasing the probability of an entity.

6. The computer-readable medium of claim 5 wherein decreasing a probability further comprises:
   determining that the decoded entity is in the class entity dictionary; and
   decreasing the probability of the decoded entity.

* * * * *